ABSTRACTED / PATENT TEXT

United States Patent Office 3,090,800
Patented May 21, 1963

3,090,800
PHOSPHORUS CONTAINING BIFUNCTIONAL ISOTHIOCYANATES AND PROCESS THEREFOR
Rudi F. W. Rätz, Hamden, Conn., assignor to Olin Mathieson Chemical Corporation, New Haven, Conn., a corporation of Virginia
No Drawing. Filed Aug. 17, 1962, Ser. No. 217,549
7 Claims. (Cl. 260—461)

This invention relates to novel bifunctional isothiocyanates, and more particularly to isothiocyanates having the following general structural formula

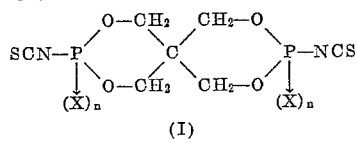

(I)

where X is selected from the group consisting of oxygen and sulfur, and $n$ is an integer of less than 2.

A copending application of the present inventor, S.N. 175,270, filed on February 23, 1962, has disclosed a process for preparing 3,9-dichloro-2,4,8,10-tetraoxa-3,9-diphosphaspiro[5.5]undecane-3,9-dioxide wherein pentaerythritol is reacted with a molar excess of phosphoryl chloride. This compound is represented by the following structural formula

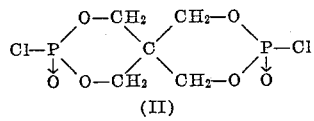

(II)

The preparation of 3,9-dichloro-2,4,8,10-tetraoxa-3,9-diphosphaspiro[5.5]undecane is described in the literature by Lucas et al. in J. Am. Chem. Soc. 72, 5491 (1950), wherein pentaerythritol is reacted with phosphorus trichloride. This compound has the structural formula

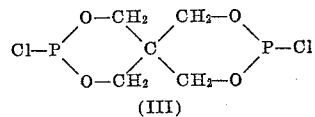

(III)

It was the principal object of this invention to prepare novel organic bifunctional isothiocyanates containing a spirane system with phosphorus atoms in both rings.

Another object of this invention was to utilize the dichlorides (II) and (III) as intermediates in the preparation of bifunctional isothiocyanates.

Still another object of this invention was to provide a convenient and efficient method for the preparation of bis-isothiocyanates having a spirane system.

Still another object of this invention was to prepare organic isothiocyanates having utility as agricultural chemicals.

Other objects of this invention will be apparent hereinafter.

These objects have been accomplished in accordance with this invention. It has been found that bifunctional isothiocyanates having the structural Formula I can be readily prepared by a process described herein. More specifically, it has been found that the dichlorides (II) and (III) can be reacted with salts of thiocyanic acid under specified experimental conditions to obtain bis-isothiocyanates containing a spirane system. An efficient process for preparing these novel isothiocyanates is also provided herein.

A typical example which illustrates the preparation of a bifunctional isothiocyanate in accordance with this invention is hereinafter described. It is to be understood that this example is illustrative only, and it should not be considered as limiting the scope of this invention inasmuch as process modifications would be obvious to those skilled in the art.

Example 1

Into a one-liter reaction flask was placed 9.5 g. (0.032 mole) of 3,9-dichloro-2,4,8,10-tetraoxa-3,9-diphosphaspiro[5.5]undecane-3,9-dioxide. This material was suspended in 140 ml. of dry acetone, and a solution of 6.4 g. (0.066 mole) of potassium thiocyanate in 150 ml. of dry acetone was added quickly with stirring to the suspension. The mixture was refluxed for one and a half hours at a bath temperature of between 60–70° C. and then it was allowed to stand overnight at room temperature. After filtering the mixture, 4.8 g. of a completely water soluble salt was collected which was the theoretical amount of potassium chloride expected assuming a quantitative yield. The acetone was removed from the filtrate in vacuo at a maximum temperature of 50° C. A cream colored, sticky residue remained which became a powdery solid after two washings with 50 ml. portions of ether. After drying, 11.3 g. of crude product having a melting point of 168–172° C. was obtained. This material was washed with 25 ml. of water at room temperature to remove about 2.0 g. of a sticky by-product. A colorless crystalline material, M.P. 197° C. was obtained, and was found to be free of chlorine content as shown by a negative Beilstein test. The following analysis indicated that the desired 3,9-bis (isothiocyanato)-2,4,8,10-tetraoxa-3,9-diphosphaspiro[5.5]undecane - 3,9 - dioxide had been obtained and the yield was 81.7% of theoretical.

Analysis.—Calcd. for $C_7H_8N_2S_2P_2O_6$: C, 24.58; H, 2.34; N, 8.19; P, 18.12. Found: C, 24.68, 24.48; H, 2.95, 2.99; N, 7.76; P, 18.40.

Infrared analysis also confirmed that the bifunctional isothiocyanate had been obtained. Powerful absorptions at $5.7\mu$ and at $5.9\mu$ are characteristic of the NCS group, while the P→O group was identified by absorption peak at $7.6\mu$.

The above example illustrates the high yields of bifunctional isothiocyanates which have been obtained by the practice of this invention. The dichlorides can be reacted with various salts of thiocyanic acid including the alkali metal, alkaline earth and heavy metal salts. However it is preferred to use the alkali metal salts in view of their greater solubility in solvents which have been used in the process. Ammonium and potassium thiocyanates have been found to be most reactive in the preferred process embodiment but satisfactory results are obtainable with lithium and sodium salts.

For best results, the thiocyanate salts should be employed in approximately equivalent amounts based on amount of dichloride used in the reaction. The use of an excess amount of either reactant does not appear to result in any significant process improvement and in fact complicates the isolation of the desired product.

The formation of the isothiocyanates proceeds rapidly at temperatures of about 50–85° C., and therefore this is the preferred process temperature range. However the desired products can be obtained even as low as 25° C. although the reaction proceeds slowly at this lower temperature.

The bis-isothiocyanates of this invention are insoluble in most of the commonly employed organic solvents. However they are soluble in acetonitrile and acetone, and therefore these solvents are conveniently employed in the process described herein. The dichlorides (II) and (III) employed as starting materials form a suspension in these solvents, and as the reaction proceeds the formed isothiocynates become soluble in the reaction medium. However the salts formed in the reaction, i.e., KCl and NH₄Cl, are also quite insoluble in the reaction solvents and can be removed by filtration along with any residual small amounts of unreacted dichloride. Thus the desired products can be obtained by the removal of solvent after reaction is complete.

The bifunctional isothiocyanates obtained in accordance with the procedure described herein can be purified by washing the crude product with small amounts of ether and water as shown in the above example. Both of these solvents appear to remove some soluble impurities although small amounts of isothiocyanates may also be lost as a result of such washing techniques.

Another compound corresponding to the structural Formula I may be readily synthesized by reacting elemental sulfur with the bis-isothiocyanate prepared from (III) and a thiocyanate. This bis-isothiocyanate can be added to a carbon disulfide solution of flower of sulfur and upon standing, a good yield of the following product is obtained.

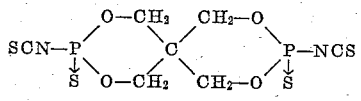

The novel isothiocyanates of this invention are useful as herbicides especially in the area of weed control. This has been shown by herbicide tests, as described in "Weeds," volume 1, pages 352–365 (1952). The compounds show selective toxicity at a dosage of 10 pounds per acre on pre-emergence tests and on post-emergence tests. The crops tested include wheat, corn, cotton and soybean and the weeds tested included pigweed, mustard, ryegrass and crabgrass.

The isothiocyanates are also quite reactive toward polyhydroxy compounds. For example, cellulose products having increased flame-proofing characteristics result from such reactions. Ethyleneimine and its homologs also react with the isothiocyanates to result in compounds having aziridinyl rings therein. These products have utility in the agricultural field particularly as insect sterilants.

What is claimed is:
1. Bifunctional isothiocyanates having the structure

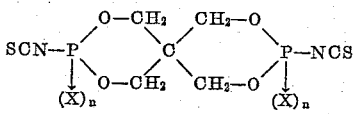

where X is selected from the group consisting of oxygen and sulfur, and $n$ is an integer less than 2.

2. An organic phosphorus compound having the structure

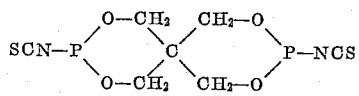

3. An organic phosphorus compound having the structure

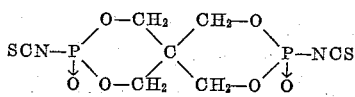

4. A method of preparing organic bifunctional isothiocyanates which comprises reacting a compound chosen from the group consisting of 3,9-dichloro-2,4,8,10-tetraoxa-3,9-diphosphaspiro[5.5]undecane and 3,9-dichloro-2, 4,8,10 - tetraoxa - 3,9 - diphosphaspiro[5.5]undecane - 3, 9-dioxide with an alkali metal thiocyanate at a temperature of about 25–85° C.

5. The method of claim 4 wherein the alkali metal salt is chosen from the group consisting of ammonium thiocyanate and potassium thiocyanate.

6. The method of claim 4 wherein a temperature range of about 50–85° C. is utilized.

7. A method of preparing organic bifunctional isothiocyanates which comprises forming a suspension of a dichloride having the formula

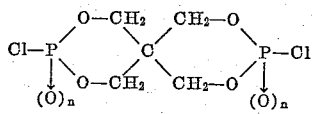

where $n$ is an integer of less than 2 in a solvent chosen from the group consisting of acetone and acetonitrile, reacting said dichloride with an alkali metal thiocyanate at a temperature of from about 25–85° C., removing insoluble salt from the reaction mixture and removing said solvent to obtain the bifunctional isothiocyanate.

No references cited.